US012347350B2

(12) United States Patent
Cho et al.

(10) Patent No.: US 12,347,350 B2
(45) Date of Patent: Jul. 1, 2025

(54) ELECTRONIC DEVICE

(71) Applicant: SAMSUNG DISPLAY CO., LTD., Yongin-si (KR)

(72) Inventors: Daeyoun Cho, Yongin-si (KR); Jongwoo Park, Seongnam-si (KR); Jiho Moon, Hwaseong-si (KR); Youngtae Choi, Asan-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 77 days.

(21) Appl. No.: 17/589,238

(22) Filed: Jan. 31, 2022

(65) Prior Publication Data

US 2022/0246072 A1 Aug. 4, 2022

(30) Foreign Application Priority Data

Feb. 1, 2021 (KR) ........................ 10-2021-0014168

(51) Int. Cl.
*G09G 3/00* (2006.01)
*G09G 3/3233* (2016.01)

(52) U.S. Cl.
CPC .......... *G09G 3/006* (2013.01); *G09G 3/3233* (2013.01); *G09G 2300/0413* (2013.01); *G09G 2300/0842* (2013.01); *G09G 2300/0861* (2013.01); *G09G 2320/0257* (2013.01); *G09G 2320/045* (2013.01); *G09G 2330/12* (2013.01)

(58) Field of Classification Search
CPC ........ G09G 3/00; G09G 3/3233; G09G 3/006; G09G 3/30; G09G 3/32; G09G 3/3208; G09G 3/3225; G09G 2300/0413; G09G 2300/0819; G09G 2300/0842; G09G 2300/0861; G09G 2310/0251; G09G 2310/0262; G09G 2320/0257;
(Continued)

(56) References Cited

U.S. PATENT DOCUMENTS 7,136,056 B2 11/2006 Lee et al.
9,799,264 B2 10/2017 Eom et al.
(Continued)

FOREIGN PATENT DOCUMENTS

JP 2007093846 A * 4/2007 ........... G02F 1/1345
KR 10-0422295 3/2004
(Continued)

OTHER PUBLICATIONS

English translate JP2007093846A Electro-Optic Device and Electronic Equipment (Year: 2007).*
Espacenet English translation of KR 20170072994 (Year: 2017).*

*Primary Examiner* — Alesa Allgood
*Assistant Examiner* — Courtney G McDonnough
(74) *Attorney, Agent, or Firm* — F. CHAU & ASSOCIATES, LLC

(57) ABSTRACT

An electronic device includes a display panel having a display region and a non-display region adjacent to the display region, and a driving circuit electrically connected to the display panel and configured to drive the display panel. The display panel includes a pixel disposed in the display region and a test circuit disposed in the non-display region. The driving circuit includes a circuit element configured to adjust an operation point of a test transistor included in the test circuit according to a voltage applied to the test circuit.

19 Claims, 15 Drawing Sheets

(58) Field of Classification Search
CPC ......... G09G 2320/045; G09G 2330/01; G09G 2330/12; H10K 50/00; H10K 59/00
USPC ...................................................... 324/760.01
See application file for complete search history.

(56) References Cited

U.S. PATENT DOCUMENTS

| | | | | |
|---|---|---|---|---|
| 10,769,972 | B2 | 9/2020 | Kim | |
| 2006/0082526 | A1* | 4/2006 | Anthony | G09G 3/3283 345/82 |
| 2015/0243229 | A1* | 8/2015 | Jung | G09G 3/3688 345/690 |
| 2015/0379910 | A1* | 12/2015 | Nishinohara | G09G 3/006 345/82 |
| 2019/0096320 | A1* | 3/2019 | Hwangbo | G09G 3/3208 |
| 2019/0311662 | A1* | 10/2019 | Kim | G09G 3/2007 |

FOREIGN PATENT DOCUMENTS

| | | | | |
|---|---|---|---|---|
| KR | 20170072994 | * | 6/2017 | G09G 3/3233 |
| KR | 10-1890135 | | 8/2018 | |
| KR | 10-2019-0108409 | | 9/2019 | |
| KR | 10-2020-0036290 | | 4/2020 | |

* cited by examiner

ELECTRONIC DEVICE

CROSS-REFERENCE TO RELATED APPLICATIONS

This U.S. non-provisional patent application claims priority under 35 U.S.C. § 119 to Korean Patent Application No. 10-2021-0014168, filed on Feb. 1, 2021, the disclosure of which is hereby incorporated by reference in its entirety.

TECHNICAL FIELD

Embodiments of the present disclosure relate to an electronic device including a test circuit.

DISCUSSION OF RELATED ART

An electronic device may include a display panel configured to display an image, and a flexible circuit film configured to drive the display panel. The display panel may include a pixel configured to generate light, or to control the transmission of light. When a data voltage having a predetermined gradation is applied to the pixel, the pixel may provide light corresponding thereto.

SUMMARY

Embodiments of the present disclosure provide an electronic device including a test circuit.

An embodiment of the inventive concept provides an electronic device including a display panel having a display region and a non-display region adjacent to the display region, and a driving circuit electrically connected to the display panel and configured to drive the display panel. The display panel includes a pixel disposed in the display region and a test circuit disposed in the non-display region. The driving circuit includes a circuit element configured to adjust an operation point of a test transistor included in the test circuit according to a voltage applied to the test circuit.

In an embodiment, the circuit element includes a programmable resistor.

In an embodiment, the circuit element includes a diode-coupled transistor.

In an embodiment, the pixel includes a pixel circuit and a light emitting element, and the pixel circuit includes the same components as the test circuit.

In an embodiment, the pixel circuit includes a driving transistor configured to control the amount of current flowing in the light emitting element, the test circuit includes a test driving transistor configured to control the amount of current provided to the circuit element, and the connection relationship of the driving transistor with other transistors in the pixel circuit is the same as the connection relationship of the test driving transistor with other test transistors in the test circuit. In an embodiment, the driving transistor is electrically connected to a power line to which a power voltage is provided, and the test driving transistor is electrically connected to a test power line to which the power voltage is provided.

In an embodiment, the operation point is an operation point of the test driving transistor.

In an embodiment, the power line and the test power line receive the power voltage through the same terminal.

In an embodiment, the power line and the test power line each receive the power voltage through different terminals.

In an embodiment, the power line and the test power line are electrically separated from each other in the display panel.

In an embodiment, the test circuit is one of a plurality of test circuits, and the plurality of test circuits includes a first test circuit and a second test circuit.

In an embodiment, during a test operation interval, a first test voltage is applied to the first test circuit and a second test voltage different from the first test voltage is applied to the second test circuit.

In an embodiment, after the test operation interval, a third test voltage is applied to the first test circuit and the second test circuit.

In an embodiment, the first test voltage is a black gradation voltage, the second test voltage is a white gradation voltage, and the third test voltage is a gray gradation voltage.

In an embodiment of the inventive concept, an electronic device includes a pixel including a light emitting element and a driving transistor configured to control the amount of current flowing in the light emitting element, a test circuit including a test driving transistor, and a driving circuit electrically connected to the pixel and the test circuit, and including a circuit element configured to adjust an operation point of the test driving transistor according to a voltage applied to the test circuit.

In an embodiment, the driving transistor is electrically connected to a power line to which a power voltage is provided, and the test driving transistor is electrically connected to a test power line to which the power voltage is provided.

In an embodiment, the power line and the test power line receive the power voltage through the same terminal.

In an embodiment, the power line and the test power line each receive the power voltage through different terminals.

In an embodiment, the power line and the test power line are electrically separated from each other.

In an embodiment, the circuit element includes a programmable resistor.

In an embodiment, the circuit element includes a diode-coupled transistor.

BRIEF DESCRIPTION OF THE DRAWINGS

The above and other features of the present inventive concept will become more apparent by describing in detail embodiments thereof with reference to the accompanying drawings, in which.

DETAILED DESCRIPTION

Figure 1:
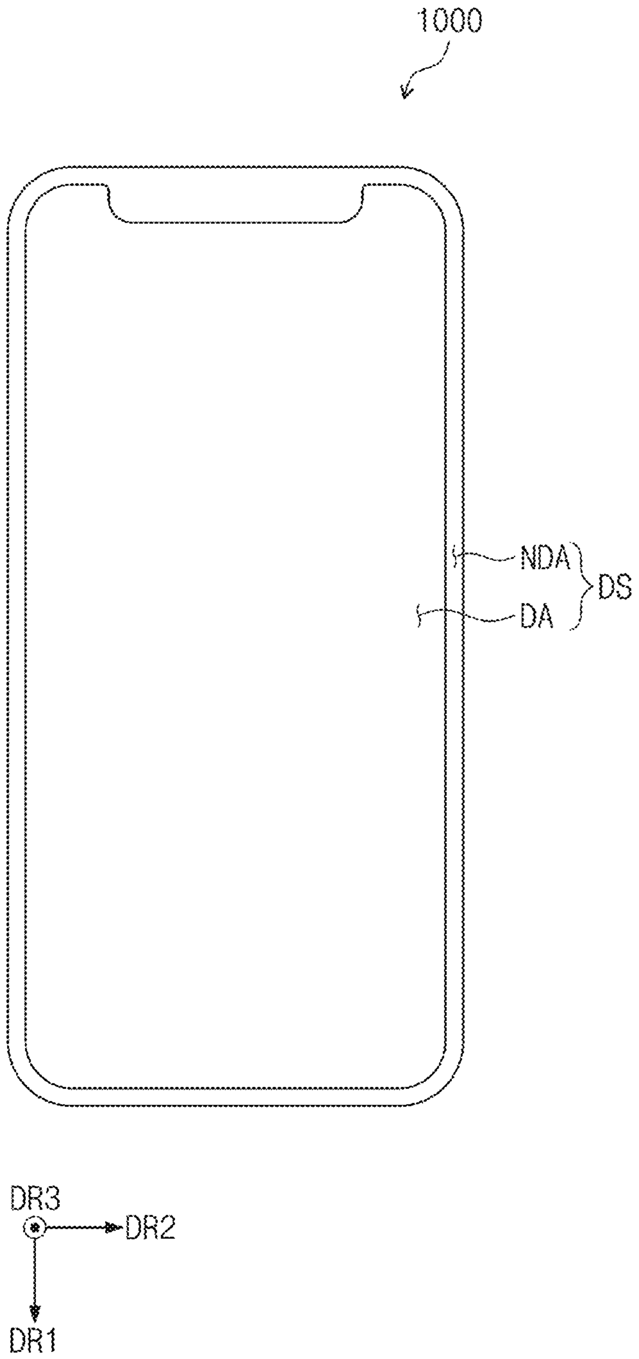
FIG. 1 is a plan view of an electronic device according to an embodiment of the inventive concept.

Embodiments of the present inventive concept will be described more fully hereinafter with reference to the accompanying drawings. Like reference numerals may refer to like elements throughout the accompanying drawings.

In the present disclosure, when an element (or a region, a layer, a portion, etc.) is referred to as being "on," "connected to," or "coupled to" another element, it means that the element may be directly disposed on/connected to/coupled to the other element, or that a third element may be disposed therebetween.

The term "and/or" includes any and all combinations of one or more of which associated elements may define.

It will be understood that, although the terms "first", "second", etc. may be used herein to describe various elements, these elements should not be limited by these terms. These terms are only used to distinguish one element from another. For example, a first element may be referred to as a second element, and a second element may also be referred to as a first element in a similar manner without departing the scope of the inventive concept. The terms of a singular form may include plural forms unless the context clearly indicates otherwise.

In addition, terms such as "below," "lower," "above," "upper," and the like are used to describe the relationship of components shown in the drawings. The terms are used as a relative concept and are described with reference to the direction indicated in the drawings.

It should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof.

FIG. 1 is a plan view of an electronic device according to an embodiment of the inventive concept.

Referring to FIG. 1, an electronic device 1000 may include a display surface DS defined by a first direction DR1 and a second direction DR2 crossing the first direction DR1. The electronic device 1000 may provide an image to a user through the display surface DS.

The display surface DS may include a display region DA and a non-display region NDA around the display region DA. An image may be displayed in the display region DA and an image is not displayed in the non-display region NDA. The non-display region NDA may surround the display region DA. However, embodiments of the inventive concept are not limited thereto. In an embodiment, the display region DA may be entirely surrounded by the non-display region NDA. The shape of the display region DA and the shape of the non-display region NDA may be changed.

Hereinafter, a direction substantially perpendicularly crossing a plane defined by the first direction DR1 and the second direction DR2 is defined as a third direction DR3. In addition, in the present disclosure, "on a plane" may be defined as a state viewed in the third direction DR3.

Figure 2:
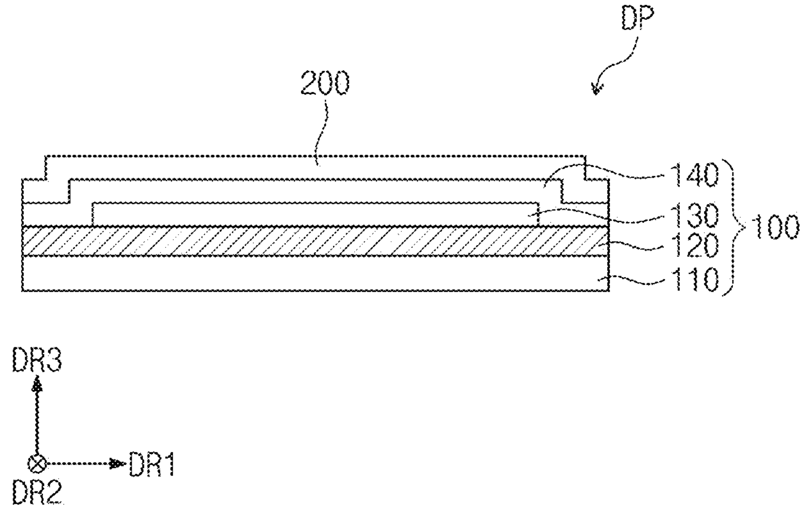
FIG. 2 is a cross-sectional view of a display panel according to an embodiment of the inventive concept.

FIG. 2 is a cross-sectional view of a display panel according to an embodiment of the inventive concept.

Referring FIGS. 1 and 2, the electronic device 1000 may include a display panel DP. In an embodiment, the electronic device 1000 may further include a window disposed on the display panel DP.

The display panel DP may include a display layer 100 and a sensor layer 200.

The display layer 100 may be a component which substantially generates an image. The display layer 100 may be a light-emitting type display layer. For example, the display layer 100 may be an organic light emitting display layer, a quantum-dot display layer, a micro-LED display layer, or a nano-LED display layer. The sensor layer 200 may be disposed on the display layer 100. The sensor layer 200 may sense an external input applied from outside of the electronic device 1000.

The display layer 100 may include a base layer 110, a circuit layer 120, a light emitting element layer 130, and an encapsulation layer 140.

The base layer 110 may be a member which provides a base surface on which the circuit layer 120 is disposed. The base layer 110 may be, for example, a glass substrate, a metal substrate, a polymer substrate, or the like. However, embodiments of the inventive concept are not limited thereto. For example, in an embodiment, the base layer 110 may be an inorganic layer, an organic layer, or a composite material layer.

The base layer 110 may have a multi-layered structure. For example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer.

Each of the first and second synthetic resin layers may include a polyimide-based resin. In addition, each of the first and second synthetic resin layers may include at least one of an acrylate-based resin, a methacryl-based resin, a polyisoprene-based resin, a vinyl-based resin, an epoxy-based resin, a urethane-based resin, a cellulose-based resin, a siloxane-based resin, a polyamide-based resin, or a perylene-based resin. In the present disclosure, "~~"-based resin means that a functional group of "~~" is included.

The circuit layer 120 may be disposed on the base layer 110. The circuit layer 120 may include, for example, an insulation layer, a semiconductor pattern, a conductive pattern, a signal line, and the like. The insulation layer, a semiconductor layer, and a conductive layer are formed on the base layer 110 by, for example, coating, deposition, and the like, and thereafter, the insulation layer, the semiconductor layer, and the conductive layer may be selectively patterned through performing a photolithography process a plurality of times. Thereafter, the semiconductor pattern, the conductive pattern, and the signal line, all included in the circuit layer 120, may be formed.

The light emitting element layer 130 may be disposed on the circuit layer 120. The light emitting element layer 130 may include a light emitting element. For example, the light emitting element layer 130 may include an organic light emitting material, a quantum dot, a quantum rod, a micro light-emitting diode (LED), or a nano LED.

The encapsulation layer 140 may be disposed on the light emitting element layer 130. The encapsulation layer 140 may protect the light emitting element layer 130 from foreign materials such as, for example, moisture, oxygen, and dust particles.

The sensor layer 200 may be disposed on the display layer 100. The sensor layer 200 may sense an external input applied from outside of the electronic device 1000. The external input may be a user input. The user input includes various forms of external inputs such as, for example, a part of a user's body (e.g., a user's finger), light, heat, a pen, and pressure.

The sensor layer 200 may be formed on the display layer 100 through a series of processes. In this case, in an embodiment, the sensor layer 200 may be directly disposed on the display layer 100. Being directly disposed means that a third component is not disposed between the sensor layer 200 and the display layer 100. That is, in an embodiment, a separate adhesive member is not disposed between the sensor layer 200 and the display layer 100. However, embodiments of the inventive concept are not limited thereto. The sensor layer 200 may be an external sensor attached to the display layer 100.

Figure 3:
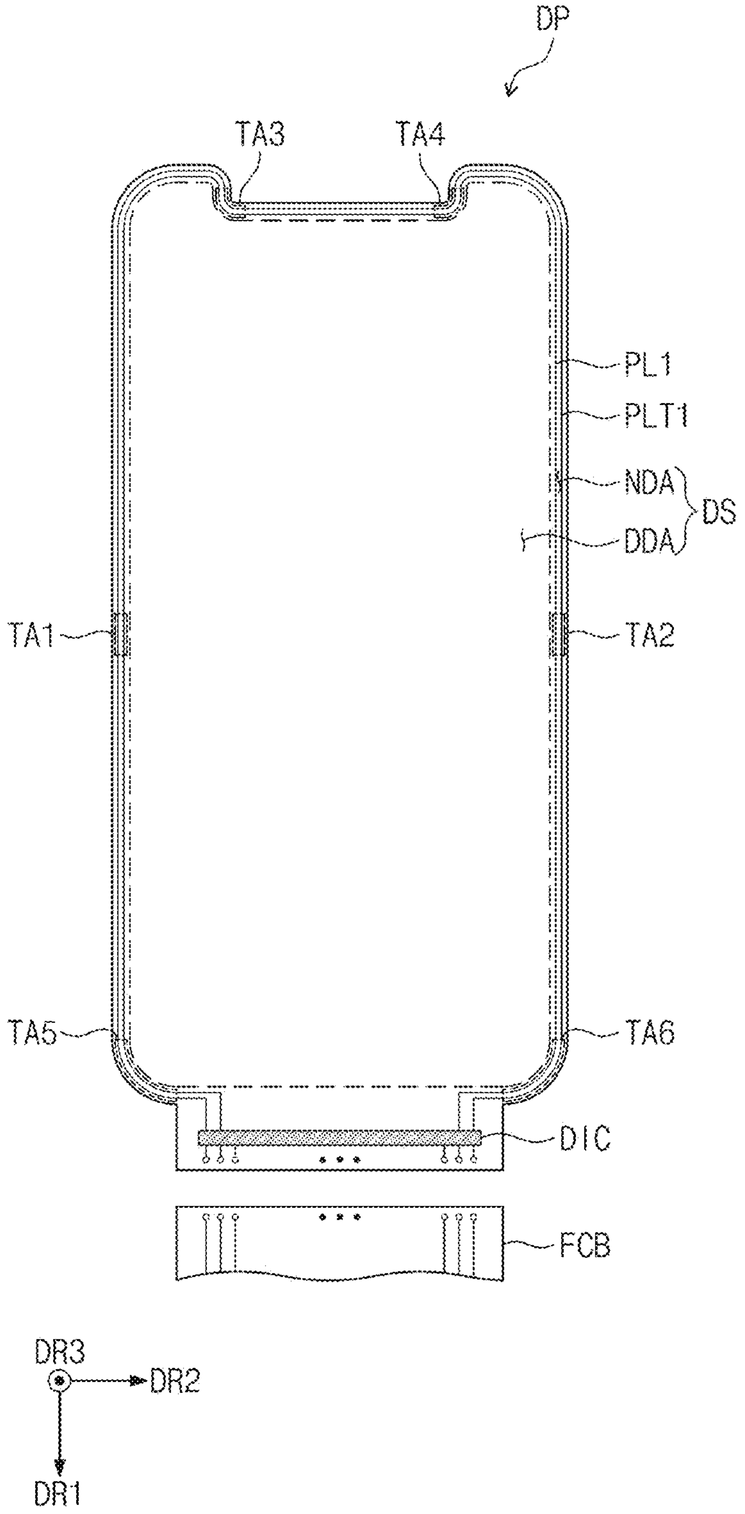
FIG. 3 is a plan view of a display panel according to an embodiment of the inventive concept.

FIG. 3 is a plan view of a display panel according to an embodiment of the inventive concept.

Referring FIGS. 1 and 3, the electronic device 1000 may include the display panel DP and a flexible circuit film FCB.

The display panel DP includes a display region DDA and a non-display region NDA respectively corresponding to the display region DA and the non-display region NDA of the electronic device 1000. In the present disclosure, "a region/portion corresponds to a region/portion" means that the region/portion overlaps the region/portion, and the regions/portions are not limited to having the same area.

A driving circuit DIC may be disposed in the non-display region NDA of the display panel DP. The driving circuit DIC may be electrically connected to the display panel DP, and may be configured to drive the display panel DP. For example, the driving circuit DIC may be electrically connected to a pixel and to a test circuit, which are described further below, of the electronic device 1000. The flexible circuit film FCB may be coupled to the non-display region NDA of the display panel DP. FIG. 3 illustrates a structure in which the driving circuit DIC is mounted on the display panel DP, but embodiments of the inventive concept are not limited thereto. For example, the driving circuit DIC may be mounted on the flexible circuit film FCB. The driving circuit DIC may also be referred to as a driver or a driving chip.

Figure 4:
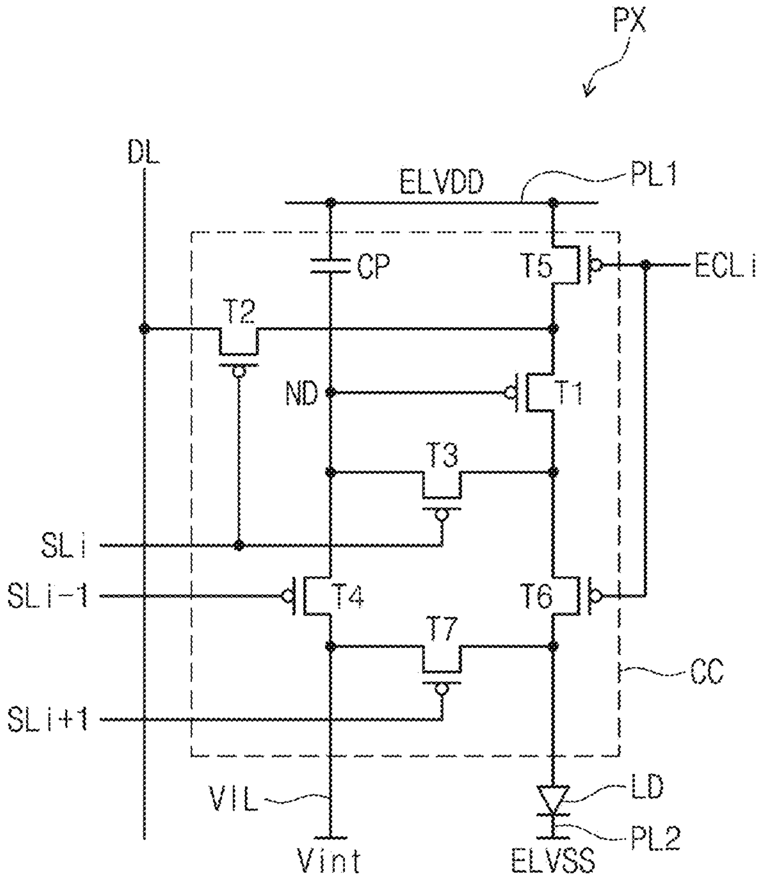
FIG. 4 is an equivalent circuit diagram of a pixel according to an embodiment of the inventive concept.

FIG. 4 is an equivalent circuit diagram of a pixel according to an embodiment of the inventive concept.

Referring FIGS. 3 and 4, the display panel DP may include a pixel PX disposed in the display region DDA. A plurality of pixels PX may be disposed in the display region DDA. FIG. 4 illustrates an equivalent circuit diagram of one pixel PX.

The pixel PX may include a light emitting element LD and a pixel circuit CC. The pixel circuit CC may include a plurality of transistors T1, T2, T3, T4, T5, T6, and T7 and a capacitor CP. The pixel circuit CC may control the amount of current flowing through the light emitting element LD in correspondence to a data signal. The light emitting element LD may emit light to a predetermined luminance in correspondence to the amount of current provided from the pixel circuit CC. The level of a first power ELVDD may be set to be higher than the level of a second power ELVSS.

The pixel PX may be electrically connected to a plurality of signal lines. Among the signal lines, FIG. 4 exemplarily illustrates scan lines SLi, SLi−1, and SLi+1, a data line DL, a first power line PL1, a second power line PL2, an initialization power line VIL, and a light emitting control line ECLi, in which i is a natural number. However, this is only an example. For example, the pixel PX according to an embodiment of the inventive concept may be additionally connected to various signal lines, and some of the illustrated signal lines may be omitted.

Each of the plurality of transistors T1, T2, T3, T4, T5, T6, and T7 may include an input electrode (or a source), an output electrode (or a drain), and a control electrode (or a gate). In the present disclosure, any one of the input electrode and the output electrode may be referred to as a first electrode, and the other thereof may be referred to as a second electrode for convenience of explanation.

A first electrode of a first transistor T1 is connected to the first power line PL1 via a fifth transistor T5. The first power line PL1 may be a line to which the first power ELVDD is provided. A second electrode of the first transistor T1 is connected to a first electrode (or an anode) of the light emitting element LD via a sixth transistor T6. The first transistor T1 may be referred to as a driving transistor in the present disclosure. The first transistor T1 (e.g., the driving transistor T1 in the pixel circuit CC) may control the amount of current flowing in the light emitting element LD.

The first transistor T1 may control the amount of current flowing in the light emitting element LD in correspondence to a voltage applied to a control electrode of the first transistor T1.

A second transistor T2 is connected between the data line DL and the first electrode of the first transistor T1. In addition, a control electrode of the second transistor T2 is connected to the i-th scan line SLi. When an i-th scan signal is provided to the i-th scan line SLi, the second transistor T2 is turned on to electrically connect the data line DL and the first electrode of the first transistor T1.

A third transistor T3 is connected between the second electrode of the first transistor T1 and the control electrode of the first transistor T1. A control electrode of the third transistor T3 is connected to the i-th scan line SLi. When the i-th scan signal is provided to the i-th scan line SLi, the third transistor T3 is turned on to electrically connect the second electrode of the first transistor T1 and the control electrode of the first transistor T1. Accordingly, when the third transistor T3 is turned on, the first transistor T1 is connected in the form of a diode.

A fourth transistor T4 is connected between a node ND and the initialization power line VIL. In addition, a control electrode of the fourth transistor T4 is connected to the i−1-th scan line SLi−1. The node ND is a node to which the fourth transistor T4 and the control electrode of the first transistor T1 are connected. When an i−1-th scan signal is provided to the i−1-th scan SLi−1, the fourth transistor T4 is turned on to provide an initialization voltage Vint to the node ND.

The fifth transistor T5 is connected between the first power line PL1 and the first electrode of the first transistor T1. The sixth transistor T6 is connected between the second electrode of the first transistor T1 and the first electrode of the light emitting element LD. A control electrode of the fifth transistor T5 and a control electrode of the sixth transistor T6 are connected to the i-th light emitting control ECLi.

A seventh transistor T7 is connected between the initialization power line VIL and the first electrode of the light emitting element LD. In addition, a control electrode of the seventh transistor T7 is connected to the i+1-th scan line SLi+1. When an i+1-th scan signal is provided to the i+1-th scan line SLi+1, the seventh transistor T7 is turned on to provide the initialization voltage Vint to the first electrode of the light emitting element LD.

The seventh transistor T7 may increase the capability of the pixel PX to display black. For example, when the seventh transistor T7 is turned on, a parasitic capacitor of the light emitting element LD is discharged. Then, when black luminance is implemented, the light emitting element LD does not emit light due to a leakage current from the first transistor T1, and accordingly, the capability of displaying black may be increased.

FIG. 4 illustrates that the control electrode of the seventh transistor T7 is connected to the i+1-th scan line SLi+1, but embodiments of the inventive concept are not limited thereto. For example, in an embodiment of the inventive concept, the control electrode of the seventh transistor T7 may be connected to the i−1-th scan line SLi−1 or the i-th scan line SLi.

Although FIG. 4 illustrates that each transistor is implemented as a p-type metal-oxide semiconductor (PMOS) transistor, embodiments of the inventive concept are not limited thereto. For example, in an embodiment of the inventive concept, the pixel circuit CC may be composed of n-type metal-oxide semiconductor (NMOS) transistors. In an embodiment of the inventive concept, the pixel circuit CC may be composed of a combination of NMOS and PMOS transistors.

The capacitor CP is disposed between the first power line PL1 and the node ND. The capacitor CP stores a voltage corresponding to a data signal. When the fifth transistor T5 and the sixth transistor T6 are turned on, the amount of current flowing through the first transistor T1 may be determined in accordance with the voltage stored in the capacitor CP.

The light emitting element LD may be electrically connected to the sixth transistor T6 and the second power line PL2. The light emitting element LD may receive the second power voltage ELVSS through the second power line PL2.

The light emitting element LD may emit light to a voltage corresponding to the difference between a signal transmitted through the sixth transistor T6 and the second power voltage ELVSS received through the second power line PL2.

An equivalent circuit of the pixel circuit CC is not limited to the equivalent circuit illustrated in FIG. 4. In an embodiment of the inventive concept, the pixel circuit CC may be modified into various forms for emitting light from the light emitting element LD.

Figure 5:
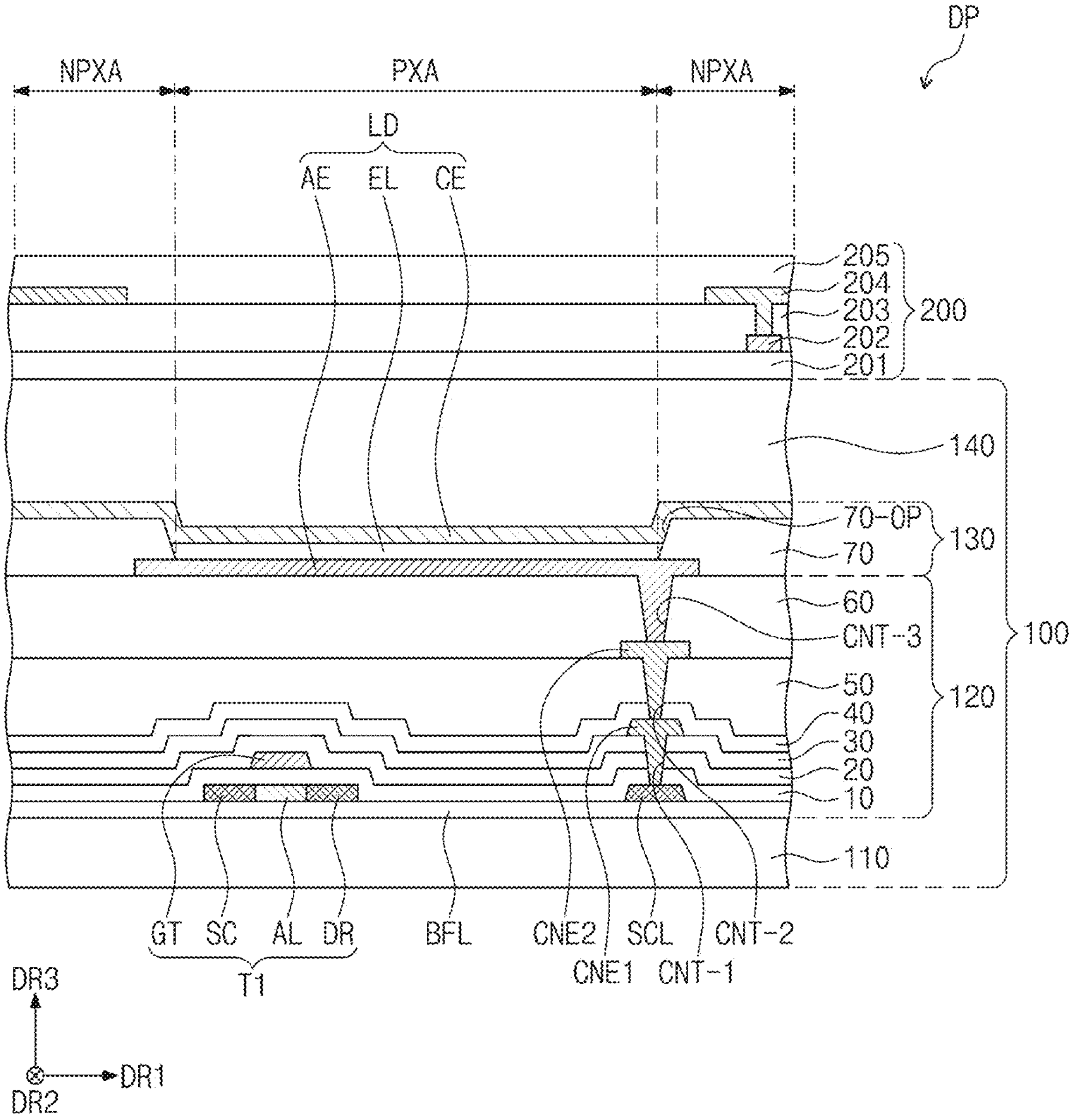
FIG. 5 is a cross-sectional view of a display panel according to an embodiment of the inventive concept.

FIG. 5 is a cross-sectional view of a display panel according to an embodiment of the inventive concept. The cross-sectional view of the display panel DP illustrated in FIG. 5 is a detailed cross-sectional view of the display panel DP illustrated in FIG. 2.

Referring to FIG. 5, at least one inorganic layer is formed on an upper surface of the base layer 110. The inorganic layer may include at least one of, for example, aluminum oxide, titanium oxide, silicon oxide, silicon nitride, silicon oxynitride, zirconium oxide, or hafnium oxide. The inorganic layer may be formed as a multi-layered inorganic layer. The multi-layered inorganic layer may constitute the barrier layer and/or the buffer layer. In an embodiment according to FIG. 5, the display layer 100 is illustrated as including a buffer layer BFL.

The buffer layer BFL may increase the bonding force between the base layer 110 and the semiconductor pattern. The buffer layer BFL may include at least one of, for example, silicon oxide, silicon nitride, or silicon oxynitride. For example, the buffer layer BFL may include a structure in which a silicon oxide layer and a silicon nitride layer are alternately stacked.

The semiconductor pattern may be disposed on the buffer layer BFL. The semiconductor pattern may include polysilicon. However, embodiments of the inventive concept are not limited thereto. For example, the semiconductor pattern may include amorphous silicon, low-temperature polycrystalline silicon, or an oxide semiconductor.

FIG. 5 only illustrates a portion of the semiconductor pattern for convenience of illustration. The semiconductor pattern may be further disposed in another region. The semiconductor pattern may be arranged according to a specific rule across pixels. The semiconductor pattern may have different electrical properties depending on whether the semiconductor pattern is doped. The semiconductor pattern may include a first region having a high conductivity rate and a second region having a low conductivity rate. The first region may be doped with an N-type dopant or a P-type dopant. A P-type transistor may include a doped region which has been doped with the P-type dopant, and an N-type transistor may include a doped region which has been doped with the N-type dopant. The second region may be a non-doped region or a region doped to a lower concentration than the first region.

The conductivity of the first region may be greater than the conductivity of the second region, and the first region may substantially serve as an electrode or a signal line. The second region may substantially correspond to an active (or a channel) of a transistor. In other words, a portion of the semiconductor pattern may be an active of the transistor, another portion thereof may be a source or a drain of the transistor, and the other portion thereof may be a connection electrode or a connection signal line.

Each of the pixels may have an equivalent circuit including seven transistors, one capacitor, and a light emitting element, and the equivalent circuit diagram of a pixel may be modified in various forms. FIG. 5 exemplarily illustrates one first transistor T1 and the light emitting element LD included in the pixel.

A source SC, an active region AL, and a drain DR of the first transistor T1 may be formed from the semiconductor pattern. The source SC and the drain DR may be extended in opposite directions from the active region AL in a cross section. FIG. 5 illustrates a portion of a connection signal line SCL formed from the semiconductor pattern. In an embodiment, the connection signal line SCL may be connected to the drain DR of the first transistor T1 on a plane.

A first insulation layer 10 may be disposed on the buffer layer BFL. The first insulation layer 10 commonly overlaps a plurality of pixels, and may cover the semiconductor pattern. The first insulation layer 10 may be an inorganic layer and/or an organic layer, and may have a single-layered structure or a multi-layered structure. The first insulation layer 10 may include at least one of, for example, aluminum oxide, titanium oxide, silicon oxide, silicon nitride, silicon oxynitride, zirconium oxide, or hafnium oxide. In an embodiment according to FIG. 5, the first insulation layer 10 may be a silicon oxide layer of a single layer. Not only the first insulation layer 10, but also, an insulation layer of the circuit layer 120 to be described later, may be an inorganic layer and/or an organic layer, and may have a single-layered structure or a multi-layered structure. The inorganic layer may include at least one of the above-described materials, but embodiments of the inventive concept are not limited thereto.

A gate GT of the first transistor T1 is disposed on the first insulation layer 10. The gate GT may be a portion of a metal pattern. The gate GT overlaps the active region AL. In a process of doping the semiconductor pattern, the gate GT may function as a mask.

A second insulation layer 20 is disposed on the first insulation layer 10, and may cover the gate GT. The second insulation layer 20 may commonly overlap pixels. The second insulation layer 20 may be an inorganic layer and/or an organic layer, and may have a single-layered structure or a multi-layered structure. The second insulation layer 20 may include at least one of, for example, silicon oxide, silicon nitride, or silicon oxynitride. In an embodiment according to FIG. 5, the second insulation layer 20 may have a multi-layered structure including a silicon oxide layer and a silicon nitride layer.

A third insulation layer 30 may be disposed on the second insulation layer 20. The third insulation layer 30 may have a single-layered structure or a multi-layered structure. For example, the third insulation layer 30 may have a multi-layered structure including a silicon oxide layer and a silicon nitride layer.

A first connection electrode CNE1 may be disposed on the third insulation layer 30. The first connection electrode CNE1 may be connected to the connection signal line SCL through a contact hole CNT-1 passing through the first to third insulation layers 10, 20, and 30.

A fourth insulation layer 40 may be disposed on the third insulation layer 30. The fourth insulation layer 40 may be a silicon oxide layer of a single layer. A fifth insulation layer 50 may be disposed on the fourth insulation layer 40. The fifth insulation layer 50 may be an organic layer.

A second connection electrode CNE2 may be disposed on the fifth insulation layer 50. The second connection electrode CNE2 may be connected to the first connection electrode CNE1 through a contact hole CNT-2 passing through the fourth insulation layer 40 and the fifth insulation layer 50.

A sixth insulation layer 60 may be disposed on the fifth insulation layer 50, and may cover the second connection electrode CNE2. The sixth insulation layer 60 may be an organic layer.

The light emitting element layer 130 may be disposed on the circuit layer 120. The light emitting element layer 130 may include the light emitting element LD. For example, the light emitting element layer 130 may include an organic light emitting material, a quantum dot, a quantum rod, a micro LED, or a nano LED. Hereinafter, the light emitting element LD is exemplarily described as being an organic light emitting element, but embodiments of the inventive concept are not limited thereto.

The light emitting element LD may include a first electrode AE, a light emitting layer EL, and a second electrode CE.

The first electrode AE may be disposed on the sixth insulation layer 60. The first electrode AE may be connected to the second connection electrode CNE2 through a contact hole CNT-3 passing through the sixth insulation layer 60.

A pixel definition film 70 is disposed on the sixth insulation layer 60, and may cover a portion of the first electrode AE. An opening 70-OP is defined on the pixel definition film 70. The opening 70-OP of the pixel definition film 70 exposes at least a portion of the first electrode AE.

The display region DDA (see FIG. 3) may include a light emitting region PXA, and a non-light emitting region NPXA adjacent to the light emitting region PXA. The non-light emitting region NPXA may surround the light emitting region PXA. In an embodiment according to FIG. 5, the light emitting region PXA is defined to correspond to some regions of the first electrode AE exposed by the opening 70-OP.

The light emitting layer EL may be disposed on the first electrode AE. The light emitting layer EL may be disposed in a region corresponding to the opening 70-OP. That is, the light emitting layer EL may be separately formed on each of the pixels. When the light emitting layer EL is separately formed on each of the pixels, each of the light emitting layers EL may emit light of at least one color of blue, red, or green. However, embodiments of the inventive concept are not limited thereto, and the light emitting layer EL may be connected to the pixels and commonly provided. In this case, the light emitting layer EL may provide blue light or white light.

The second electrode CE may be disposed on the light emitting layer EL. The second electrode CE has an integral shape, and may be commonly disposed in the plurality of pixels.

In an embodiment, a hole control layer may be disposed between the first electrode AE and the light emitting layer EL. The hole control layer may be commonly disposed in the light emitting region PXA and the non-light emitting region NPXA. The hole control layer includes a hole transport layer, and may further include a hole injection layer. An electron control layer may be disposed between the light emitting layer EL and the second electrode CE. The electron control layer includes an electron transport layer, and may further include an electron injection layer. The hole control layer and the electron control layer may be commonly formed on the plurality of pixels using an open mask.

The encapsulation layer 140 may be disposed on the light emitting element layer 130. The encapsulation layer 140 may include, for example, an inorganic layer, an organic layer, and an inorganic layer sequentially stacked, but layers constituting the encapsulation layer 140 are not limited thereto.

The inorganic layers may protect the light emitting element layer 130 from, for example, moisture and oxygen, and the organic layer may protect the light emitting element layer 130 from foreign materials such as, for example, dust particles. The inorganic layers may include, for example, a silicon nitride layer, a silicon oxynitride layer, a silicon oxide layer, a titanium oxide layer, an aluminum oxide layer, or the like. The organic layer may include, for example, an acrylic organic layer, but embodiments of the inventive concept are not limited thereto.

The sensor layer 200 may include a base layer 201, a first conductive layer 202, a sensing insulation layer 203, a second conductive layer 204, and a cover insulation layer 205.

The base layer 201 may be an inorganic layer including at least one of, for example, silicon nitride, silicon oxynitride, or silicon oxide. Alternatively, the base layer 201 may be an organic layer including, for example, an epoxy resin, an acrylic resin, or an imide-based resin. The base layer 201 may have a single-layered structure, or a multi-layered structure in which layers are stacked along the third direction DR3.

Each of the first conductive layer 202 and the second conductive layer 204 may have a single-layered structure, or a multi-layered structure in which layers are stacked along the third direction DR3.

A conductive layer of a single-layered structure may include a metal layer or a transparent conductive layer. The metal layer may include, for example, molybdenum, silver, titanium, copper, aluminum, or an alloy thereof. The transparent conductive layer may include a transparent conductive oxide such as, for example, indium tin oxide (ITO), indium zinc oxide (IZO), zinc oxide (ZnO), indium tin zinc oxide (ITZO), or the like. In addition, the transparent conductive layer may include a conductive polymer such as, for example, PEDOT, a metal nanowire, graphene, and the like.

A conductive layer of a multi-layered structure may include metal layers. The metal layers may have, for example, a three-layered structure of titanium/aluminum/titanium. The conductive layer of a multi-layered structure may include at least one metal layer and at least one transparent conductive layer.

At least one of the sensing insulation layer 203 and the cover insulation layer 205 may include an inorganic film. The inorganic film may include at least one of, for example, aluminum oxide, titanium oxide, silicon oxide, silicon nitride, silicon oxynitride, zirconium oxide, or hafnium oxide.

At least one of the sensing insulation layer 203 and the cover insulation layer 205 may include an organic film. The organic film may include at least any one among, for example, an acrylic resin, a methacrylic-based resin, polyisoprene, a vinyl-based resin, an epoxy-based resin, a urethane-based resin, a cellulose-based resin, a siloxane-based resin, a polyimide-based resin, a polyamide-based resin, or a perylene-based resin.

Figure 6:
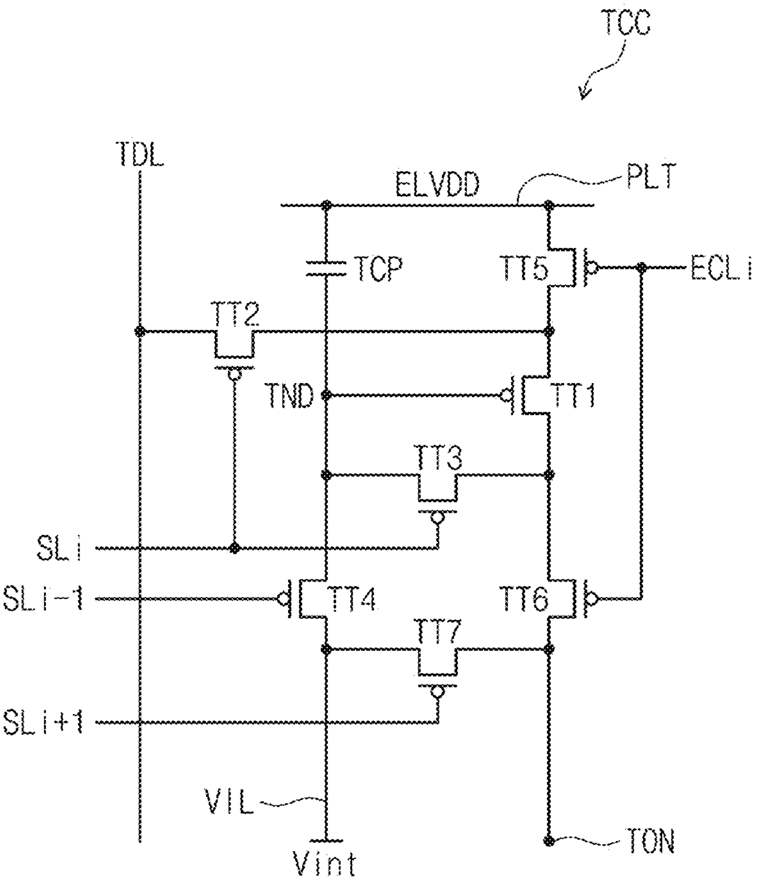
FIG. 6 is an equivalent circuit diagram of a test circuit according to an embodiment of the inventive concept.

FIG. 6 is an equivalent circuit diagram of a test circuit according to an embodiment of the inventive concept.

Referring to FIGS. 4 to 6, when compared to the pixel PX, in an embodiment, a test circuit TCC does not include the light emitting element LD. Other than the light emitting element LD, the test circuit TCC may substantially include the same components as the pixel circuit CC of the pixel PX. For convenience of explanation, a further description of elements and technical aspects previously described may be omitted herein when describing FIG. 6.

The test circuit TCC may include a plurality of test transistors TT1, TT2, TT3, TT4, TT5, TT6, and TT7, a capacitor TCP, and a node TND. The test circuit TCC may control the amount of current flowing to an output node TON in correspondence to a data signal.

A first electrode of a first test transistor TT1 may be connected to a test power line PLT via a fifth test transistor TT5. The test power line PLT may be a line to which the first power voltage ELVDD is provided. A second electrode of the first test transistor TT1 is connected to the output node TON via a sixth test transistor TT6. The first test transistor TT1 may be referred to as a test driving transistor in the present disclosure. The first test transistor TT1 (e.g., the driving transistor in the test circuit TCC) may control the amount of current provided to a circuit element, which will be described further below, included in the driving circuit DIC. In an embodiment, a connection relationship of the first test transistor TT1 (e.g., the test driving transistor in the test circuit TCC) with the other test transistors TT2, TT3, TT4, TT5, TT6, and TT7 in the test circuit TCC is the same as a connection relationship of the first transistor T1 (e.g., the driving transistor in the pixel circuit CC) with the other transistors T1, T2, T3, T4, T5, T6, and T7 in the pixel circuit CC.

A second test transistor TT2 is connected between a test data line TDL and the first test transistor TT1. A test voltage may be provided to the test data line TDL. For example, a first test voltage of a black gradation, a second test voltage of a white gradation, or a third test voltage of a gray gradation may be provided to the test data line TDL.

Referring back to FIG. 3, in the non-display region NDA, first to sixth test regions TA1, TA2, TA3, TA4, TA5, and TA6 are illustrated. Each of the first to sixth test regions TA1, TA2, TA3, TA4, TA5, and TA6 may be a region in which the test circuit TCC may be disposed. That is, the test circuit TCC may be disposed in the non-display region NDA. A plurality of test circuits may be disposed in each of the first to sixth test regions TA1, TA2, TA3, TA4, TA5, and TA6, or test circuits may be disposed in some of the first to sixth test regions TA1, TA2, TA3, TA4, TA5, and TA6, while test circuits may not be disposed in others thereof.

Figure 7A:
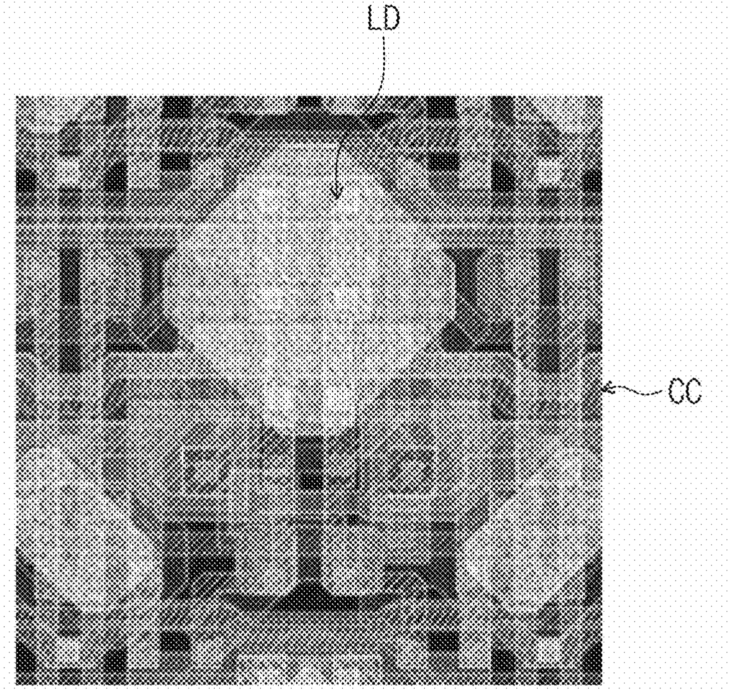
FIG. 7A is a photograph of a region in which a pixel according to an embodiment of the inventive concept is disposed.
Figure 7B:
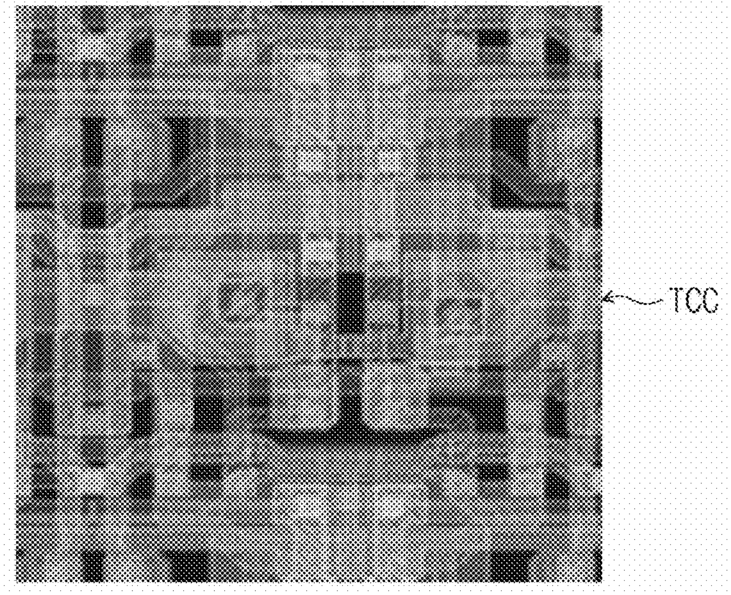
FIG. 7B is a photograph of a region in which a test circuit according to an embodiment of the inventive concept is disposed.

FIG. 7A is a photograph of a region in which a pixel according to an embodiment of the inventive concept is disposed. FIG. 7B is a photograph of a region in which a test circuit according to an embodiment of the inventive concept is disposed.

Referring to FIGS. 3, 4 and 7A, a photograph of the pixel PX disposed in the display region DDA is illustrated. The pixel PX may include the pixel circuit CC and the light emitting element LD electrically connected to the pixel circuit CC.

Referring to FIGS. 3, 6 and 7B, a photograph of the test circuit TCC disposed in the non-display region NDA is illustrated. When compared to the pixel PX, the test circuit TCC does not include the light emitting element LD.

The test circuit TCC may be a circuit used during the evaluation of an afterimage of the display panel DP. The test circuit TCC may be referred to as a dummy pixel or a missing pixel. According to an embodiment of the inventive concept, afterimage properties may be tested with the test circuit TCC instead of the pixel PX. That is, since afterimage properties are tested using the test circuit TCC, the pixel PX used to display an actual image is not deteriorated by an afterimage properties test according to embodiments of the inventive concept. Therefore, the afterimage properties test may be conducted on all display panels DP, and as a result, the reliability of the display panel DP may be increased.

Figure 8:
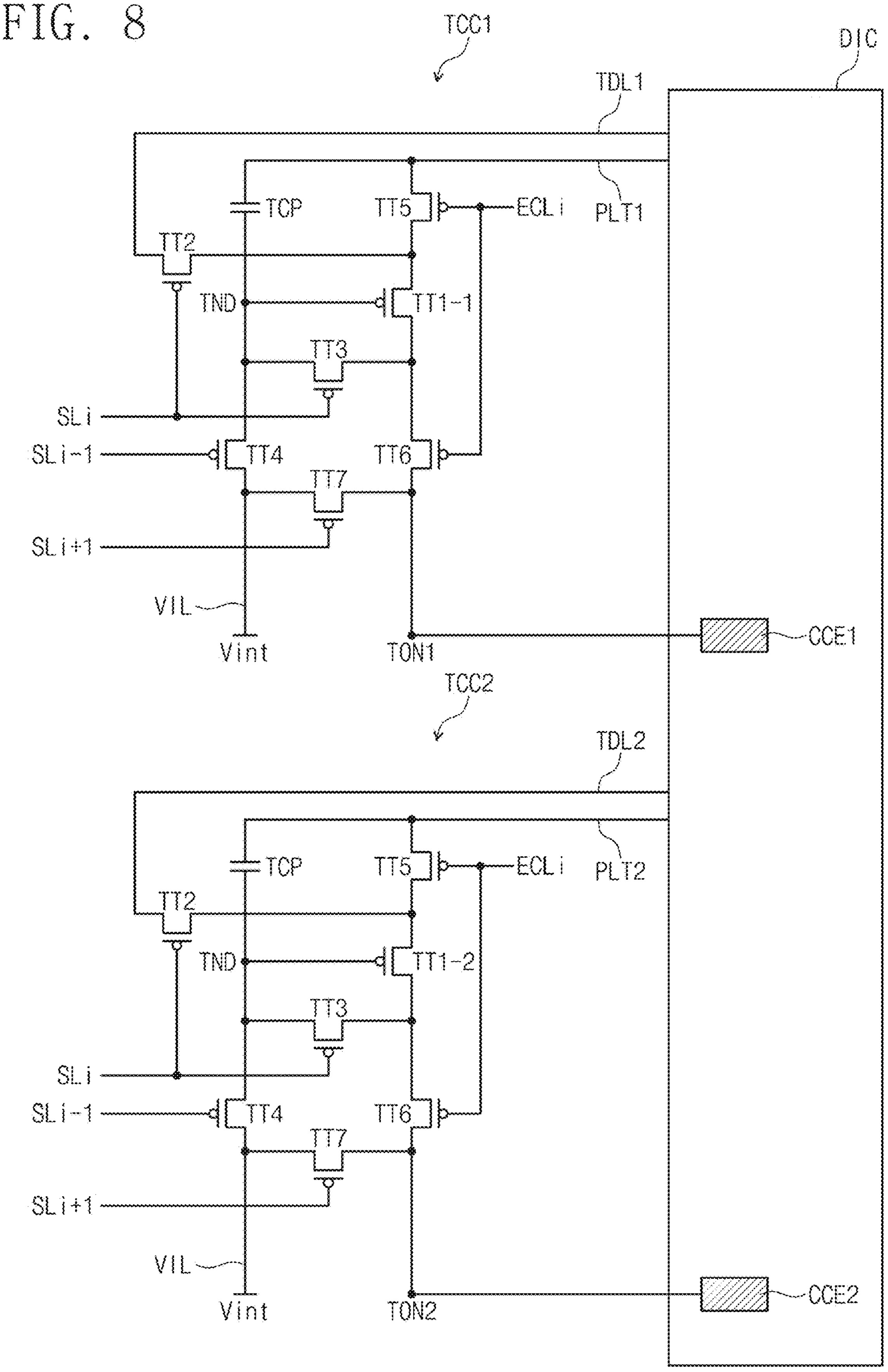
FIG. 8 is a view illustrating a test circuit and a flexible circuit film according to an embodiment of the inventive concept.

FIG. 8 is a view illustrating a test circuit and a flexible circuit film according to an embodiment of the inventive concept. For convenience of explanation, a further description of elements and technical aspects previously described, for example, with reference to the test circuit TCC of FIG. 6, may be omitted.

Referring to FIG. 8, a first test circuit TCC1, a second test circuit TCC2, and the driving circuit DIC are illustrated. The first test circuit TCC1 may be disposed in a first test region TA1 (see FIG. 3), and the second test circuit TCC2 may be disposed in a second test region TA2 (see FIG. 3), but this is only an example, and embodiments of the inventive concept are not limited thereto.

The first test circuit TCC1 may receive a test voltage through a first test data line TDL1, and the second test circuit TCC2 may receive a test voltage through a second test data line TDL2.

The first test circuit TCC1 may receive the first power voltage ELVDD through a first test power line PLT1, and the second test circuit TCC2 may receive the first power voltage ELVDD through a second test power line PLT2. The first test power line PLT1 and the second test power line PLT2 may be connected to each other in the display panel DP (see FIG. 3), or may be separated from each other.

The driving circuit DIC may include a first circuit element CCE1 connected to the first test circuit TCC1 and a second circuit element CCE2 connected to the second test circuit TCC2. An operation point of a first test driving transistor TT1-1 included in the first test circuit TCC1 may be adjusted by the first circuit element CCE1, and an operation point of a second test driving transistor TT1-2 included in the second test circuit TCC2 may be adjusted by the second circuit element CCE2.

Each of the first circuit element CCE1 and the second circuit element CCE2 may simulate I-V properties of the light emitting element LD (see FIG. 4). Therefore, even when the light emitting element LD (see FIG. 4) is not connected to the first and second test circuits TCC1 and TCC2, currents sensed through first and second output nodes TON1 and TON2 may be similar to currents sensed when the light emitting element LD (see FIG. 4) is connected to the first and second output nodes TON1 and TON2. Therefore, afterimage properties of the pixel PX (see FIG. 4) may be confirmed using the first and second test circuits TCC1 and TCC2 instead of the pixel PX.

Figure 9:
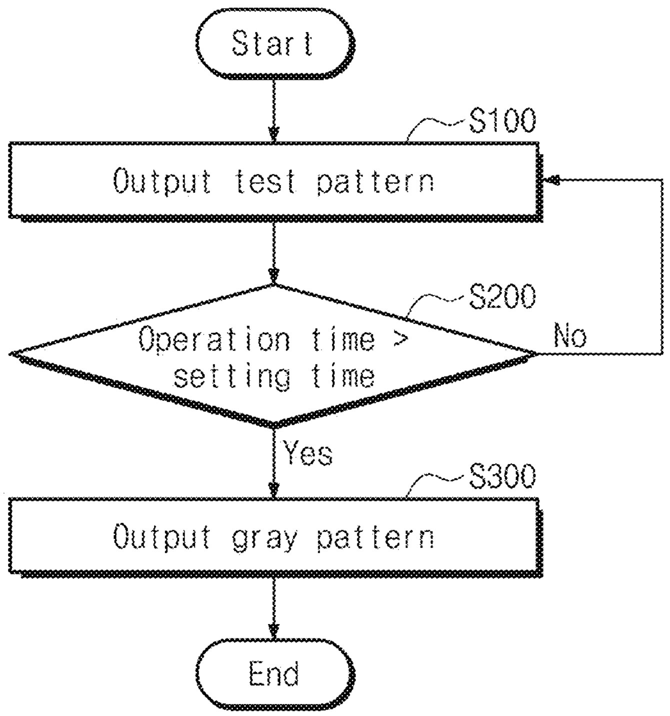
FIG. 9 is a flowchart illustrating a test method according to an embodiment of the inventive concept.
Figure 10A:
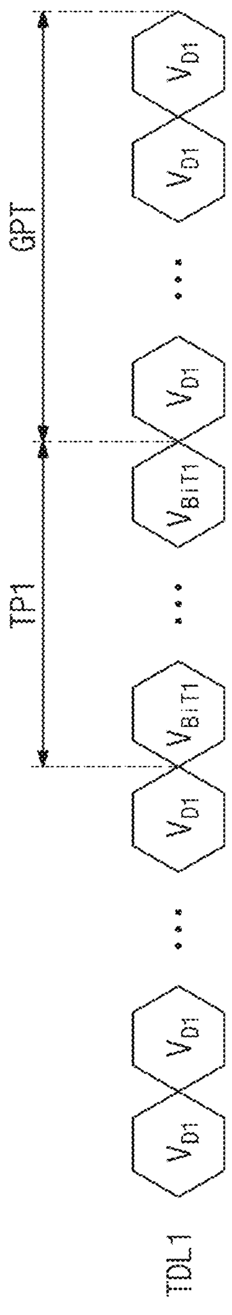
FIG. 10A is a view illustrating a data voltage applied to a first test circuit according to an embodiment of the inventive concept.
Figure 10B:
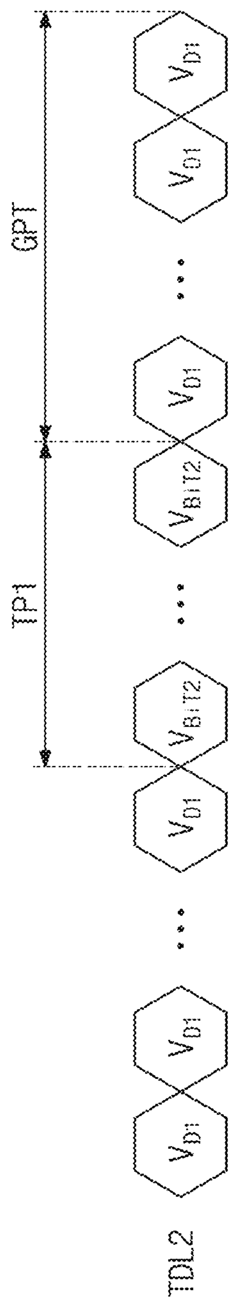
FIG. 10B is a view illustrating a data voltage applied to a second test circuit according to an embodiment of the inventive concept.

FIG. 9 is a flowchart illustrating a test method according to an embodiment of the inventive concept. FIG. 10A is a view illustrating a data voltage applied to a first test circuit according to an embodiment of the inventive concept. FIG. 10B is a view illustrating a data voltage applied to a second test circuit according to an embodiment of the inventive concept.

Referring to FIGS. 8 and 9, the driving circuit DIC outputs a test pattern to the first test circuit TCC1 and the second test circuit TCC2 (S100). The test pattern may be a black pattern or a white pattern. For example, a black pattern may be output to the first test circuit TCC1, and a white pattern may be output to the second test circuit TCC2.

Operation time and setting time are compared (S200). The operation time means the time at which the test pattern is output, and the setting time means the preset time. When the operation time exceeds the setting time, the driving circuit DIC outputs a gray pattern (S300). When the operation time is less than or equal to the setting time, the driving circuit DIC outputs the test pattern.

According to an embodiment of the inventive concept, afterimage properties may be tested using the first and second test circuits TCC1 and TCC2 which are separated from the pixel PX (see FIG. 4). Therefore, afterimage properties may be tested using the first and second test circuits TCC1 and TCC2 at the time of luminance correction or spot correction of the pixel PX (see FIG. 4), rather than adding separate time for an afterimage properties test. Therefore, additional inspection time for afterimage property inspection may be omitted according to embodiments of the inventive concept.

Referring to FIGS. 10A and 10B, a third test voltage $V_{D1}$ may be applied to each of the first test circuit TCC1 and the second test circuit TCC2 before a test operation interval TP1. The third test voltage $V_{D1}$ may be a voltage of a gray gradation. For example, the third test voltage $V_{D1}$ may be a voltage corresponding to 31 gray gradation.

During the test operation interval TP1, a first test voltage $V_{BIT1}$ may be applied to the first test circuit TCC1, and a second test voltage $V_{BIT2}$ may be applied to the second test circuit TCC2. The first test voltage $V_{BIT1}$ and the second test voltage $V_{BIT2}$ may be different from each other. For example, the first test voltage $V_{BIT1}$ may be a voltage of a black gradation, and the second test voltage $V_{BIT2}$ may be a voltage of a white gradation.

The first test voltage $V_{BIT1}$ may be a voltage corresponding to the luminance of 0 nit, the second test voltage $V_{BIT2}$ may be a voltage corresponding to the luminance of 650 nit, and the third test voltage $V_{D1}$ may be a voltage corresponding to the luminance of 300 nit.

After the test operation interval TP1, the third test of the $V_{D1}$ may be applied to the first test circuit TCC1 and the second test circuit TCC2 during a current change monitoring interval GPT. While the third test voltage $V_{D1}$ is applied, a current output to the first output node TON1 and a current output to the second output node TON2 may be monitored.

Figure 11:
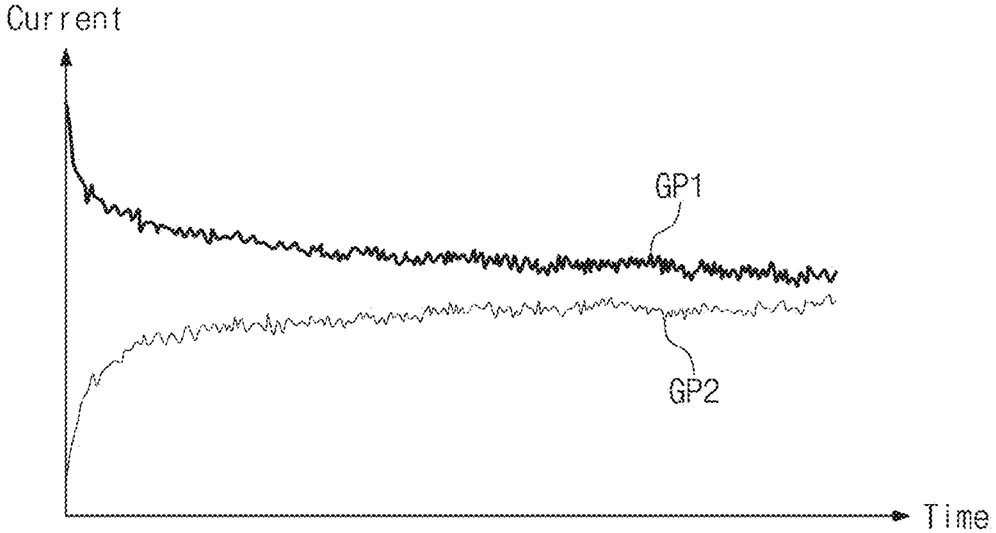
FIG. 11 is a graph illustrating a current measured in a first test circuit and in a second test circuit over time according to an embodiment of the inventive concept.

FIG. 11 is a graph illustrating a current measured in a first test circuit and in a second test circuit over time according to an embodiment of the inventive concept. The current illustrated in FIG. 11 may be a current measured after the test operation interval TP (see FIGS. 10A and 10B).

Referring to FIGS. 8, 10A, 10B, and 11, a first graph GP1 is a graph illustrating a current output from the first output node TON1 of the first test circuit TCC1, and a second graph GP2 is a graph illustrating a current output from the second output node TON2 of the second test circuit TCC2.

The length of the current change monitoring interval may be adjusted according to the length of the test operation interval TP1. For example, when the length of the test operation interval TP1 is 1 minute, the length of the current change monitoring interval GPT may be 10 seconds, when the length of the test operation interval TP1 is 3 minutes, the length of the test operation interval GPT may be 1 minute, and when the length of the test operation interval TP1 is 10 minutes, the length of the current change monitoring interval GPT may be 10 minutes.

By comparing a current measured from the first test circuit TCC1 and a current measured from the second test circuit TCC2, the degree of deterioration may be determined. According to an embodiment of the inventive concept, since afterimage properties are tested using the first and second test circuits TCC1 and TCC2, the pixel PX (see FIG. 4) used to display an actual image is not deteriorated by an afterimage properties test. Therefore, the afterimage properties test may be conducted on all display panels DP (see FIG. 3), and as a result, the reliability of the display panel DP (see FIG. 3) may be increased.

Figure 12:
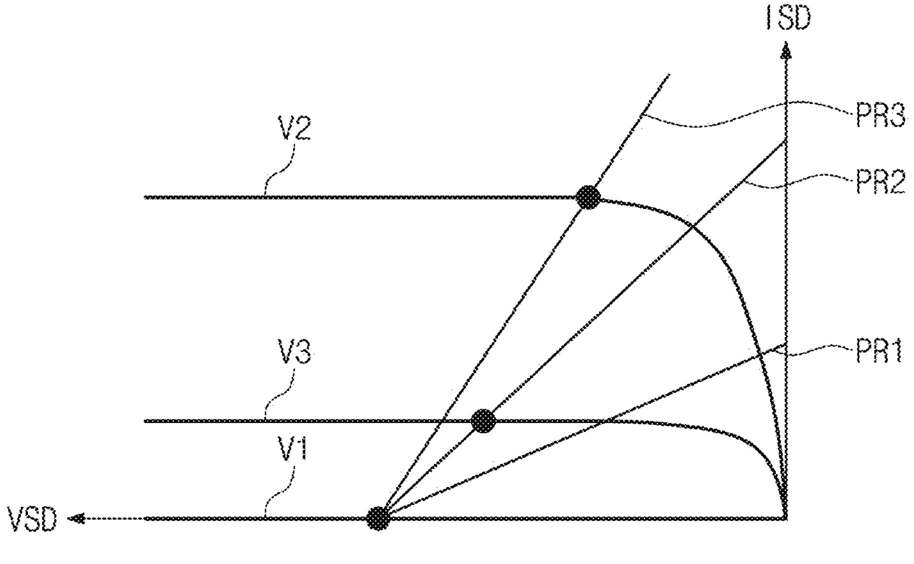
FIG. 12 is a graph illustrating a current voltage properties curve of a test driving transistor according to embodiment of the inventive concept.

FIG. 12 is a graph illustrating a current voltage properties curve of a test driving transistor according to embodiment of the inventive concept.

Referring to FIGS. 6 and 12, a voltage VSD may be a voltage between a source and a drain of the first test transistor TT1, and a current ISD may be a current passing through from the source to the drain of the first test transistor TT1.

According to an embodiment of the inventive concept, the driving circuit DIC may include the circuit element CCE1 (see FIG. 9) electrically connected to the output node TON. The circuit element CCE1 (see FIG. 9) may be a programmable resistor. For example, the resistance of the programmable resistor may be changed according to a voltage between the source and a gate of the first test transistor TT1.

As the resistance of the programmable resistor is changed, load lines PR1, PR2, and PR3 may also be changed. For example, a load line PR1 when a first test voltage V1 is applied to the source-gate of the first test transistor TT1, a load line PR2 when a second test voltage V2 is applied to the source-gate of the first test transistor TT1, and a load line PR3 when a third test voltage V3 is applied to the source-gate of the first test transistor TT1 may be different from each other.

The programmable resistor may simulate I-V properties of the light emitting element LD (see FIG. 4). Therefore, even when the light emitting element LD (see FIG. 4) is not connected to the test circuit TCC, a current sensed though the output node TON may be similar to a current sensed when the light emitting element LD (see FIG. 4) is connected to the output node TON. Therefore, afterimage properties of the pixel PX may be confirmed using the test circuit TCC instead of the pixel PX.

Figure 13A:
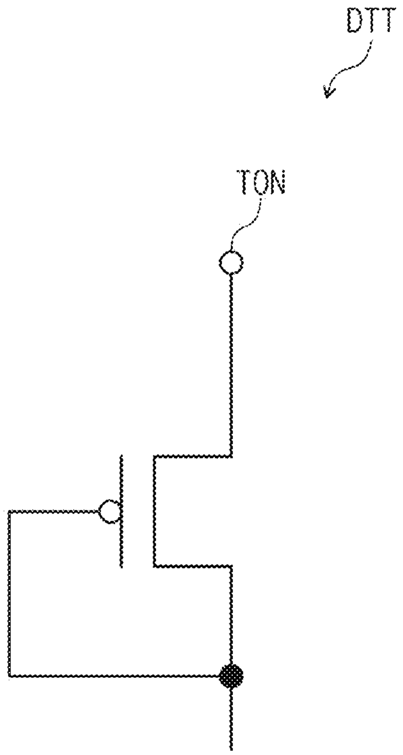
FIG. 13A is an equivalent circuit diagram of a circuit element according to an embodiment of the inventive concept.
Figure 13B:
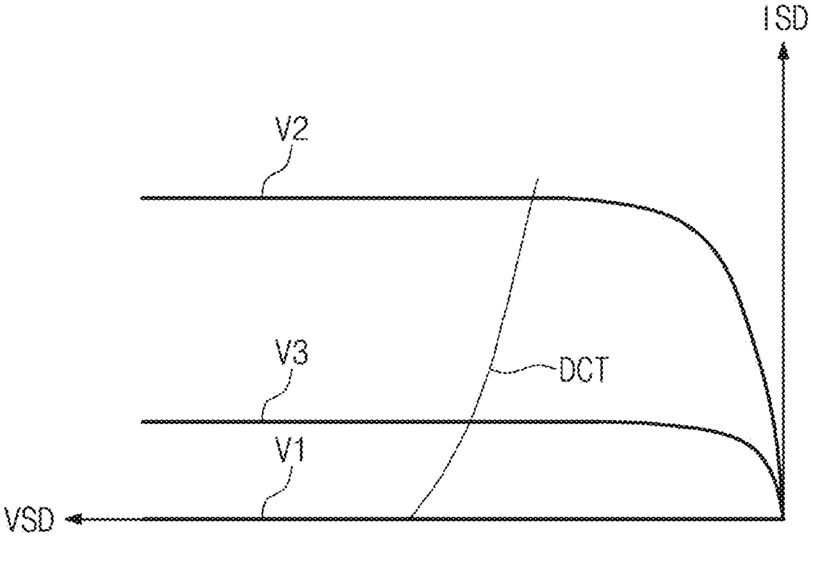
FIG. 13B is a graph illustrating a current voltage properties curve of a test driving transistor according to embodiment of the inventive concept.

FIG. 13A is an equivalent circuit diagram of a circuit element according to an embodiment of the inventive concept. FIG. 13B is a graph illustrating a current voltage properties curve of a test driving transistor according to embodiment of the inventive concept.

Referring to FIGS. 6, 13A, and 13B, the driving circuit DIC (see FIG. 3) may include a circuit element electrically connected to the output node TON. The circuit element may be a diode-coupled transistor DTT. FIG. 13B illustrates a load curve DCT of the diode-coupled transistor DTT.

The diode-coupled transistor DTT may simulate the I-V properties of the light emitting element LD (see FIG. 4). Therefore, even when the light emitting element LD (see FIG. 4) is not connected to the test circuit TCC, a current sensed though the output node TON may be similar to a current sensed when the light emitting element LD (see FIG. 4) is connected to the output node TON. Therefore, afterimage properties of the pixel PX may be confirmed using the test circuit TCC instead of the pixel PX.

Figure 14:
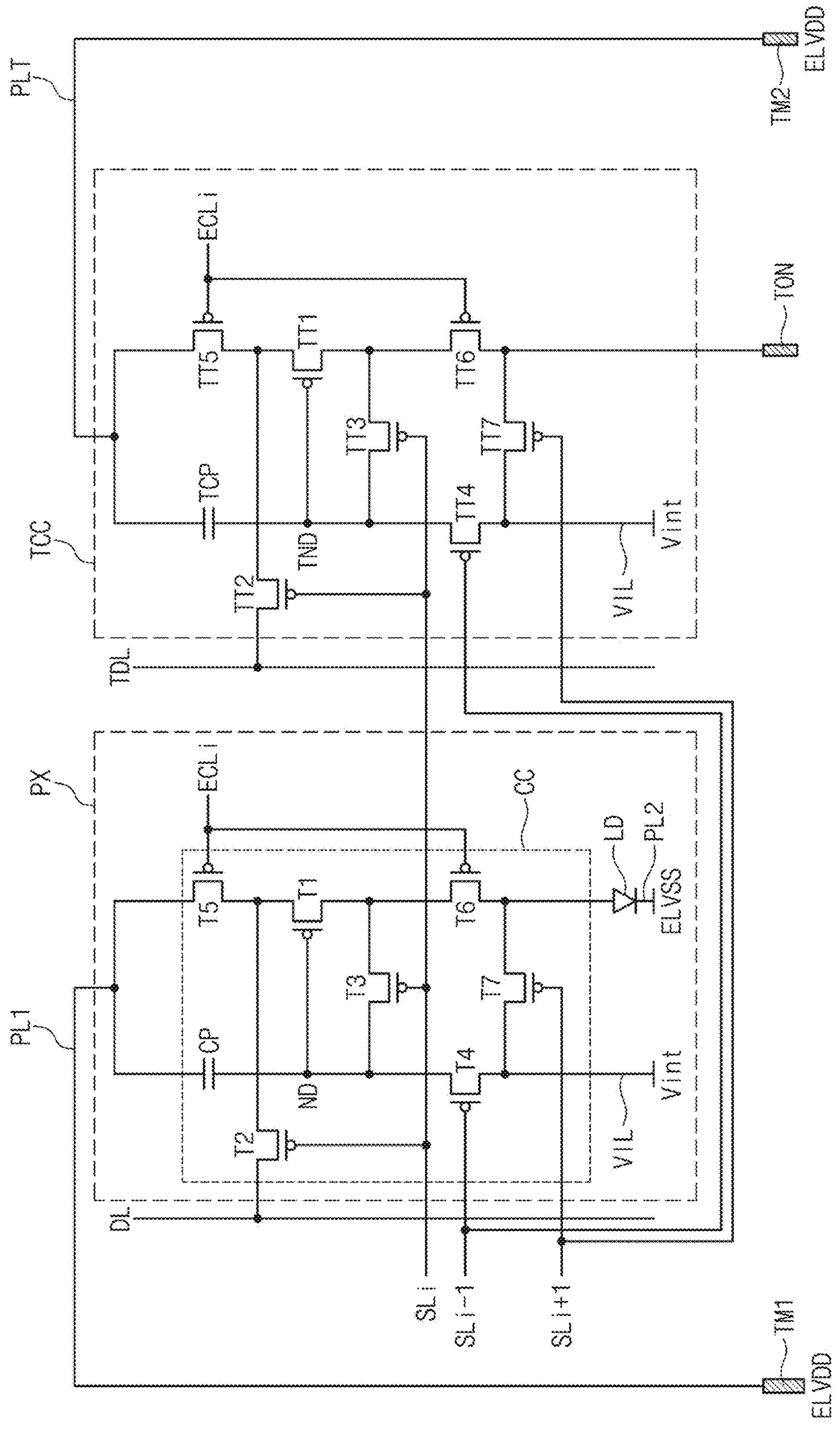
FIG. 14 is an equivalent circuit diagram of a pixel and a test circuit according to an embodiment of the inventive concept.

FIG. 14 is an equivalent circuit diagram of a pixel and a test circuit according to an embodiment of the inventive concept. For convenience of explanation, a further description of elements and technical aspects previously described may be omitted.

FIG. 14 illustrates the pixel PX and the test circuit TCC. The pixel PX may receive the first power voltage ELVDD through the first power line PL1, and the test circuit TCC may receive the first power voltage ELVDD through the test power line PLT. That is, the pixel PX and the test circuit TCC may receive the same first power voltage ELVDD through different lines.

The first power line PL1 and the test power line PLT may each receive the first power voltage ELVDD through different terminals. For example, the first power line PL1 may receive the first power voltage ELVDD through a first terminal TM1, and the test power line PLT may receive the first power voltage ELVDD through a second terminal TM2. The first power line PL1 and the test power line PLT may be electrically separated from each other in the display panel DP.

In this case, in an embodiment, the second terminal TM2 may receive the first power voltage ELVDD only in a test step, and does not receive the first power voltage ELVDD thereafter. Therefore, while the pixel PX is displaying an image, the first power voltage ELVDD is not applied to the test circuit TCC in an embodiment.

The test power line PLT may be disposed on the same layer as any one of conductive layers constituting the circuit layer 120 (see FIG. 5). For example, the test power line PLT may be disposed on the same layer as the second connection electrode CNE2 (see FIG. 5), and the test power line PLT may be disposed between the fifth insulation layer 50 (see FIG. 5) and the sixth insulation layer 60 (see FIG. 5).

Figure 15:
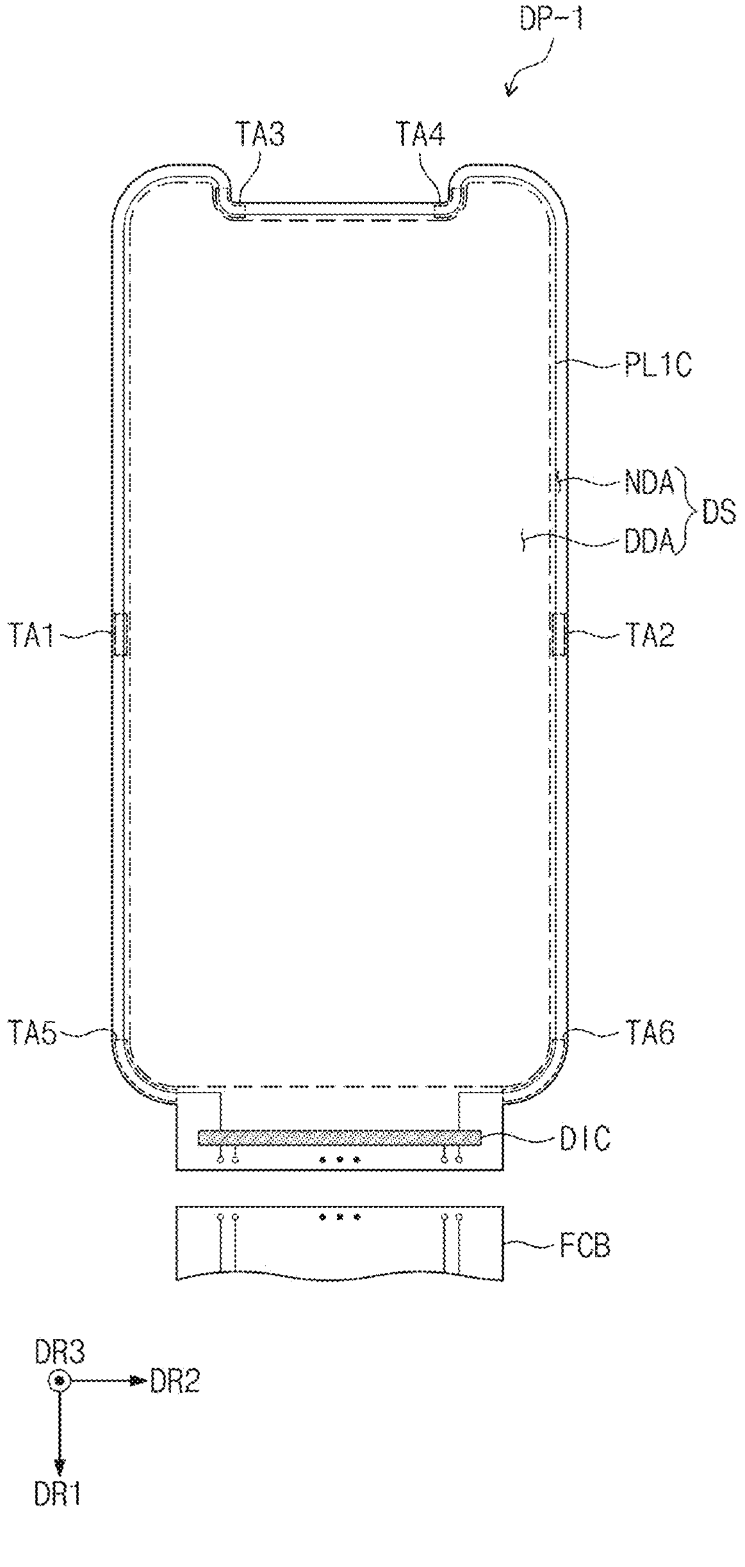
FIG. 15 is a plan view of a display panel according to an embodiment of the inventive concept.
Figure 16:
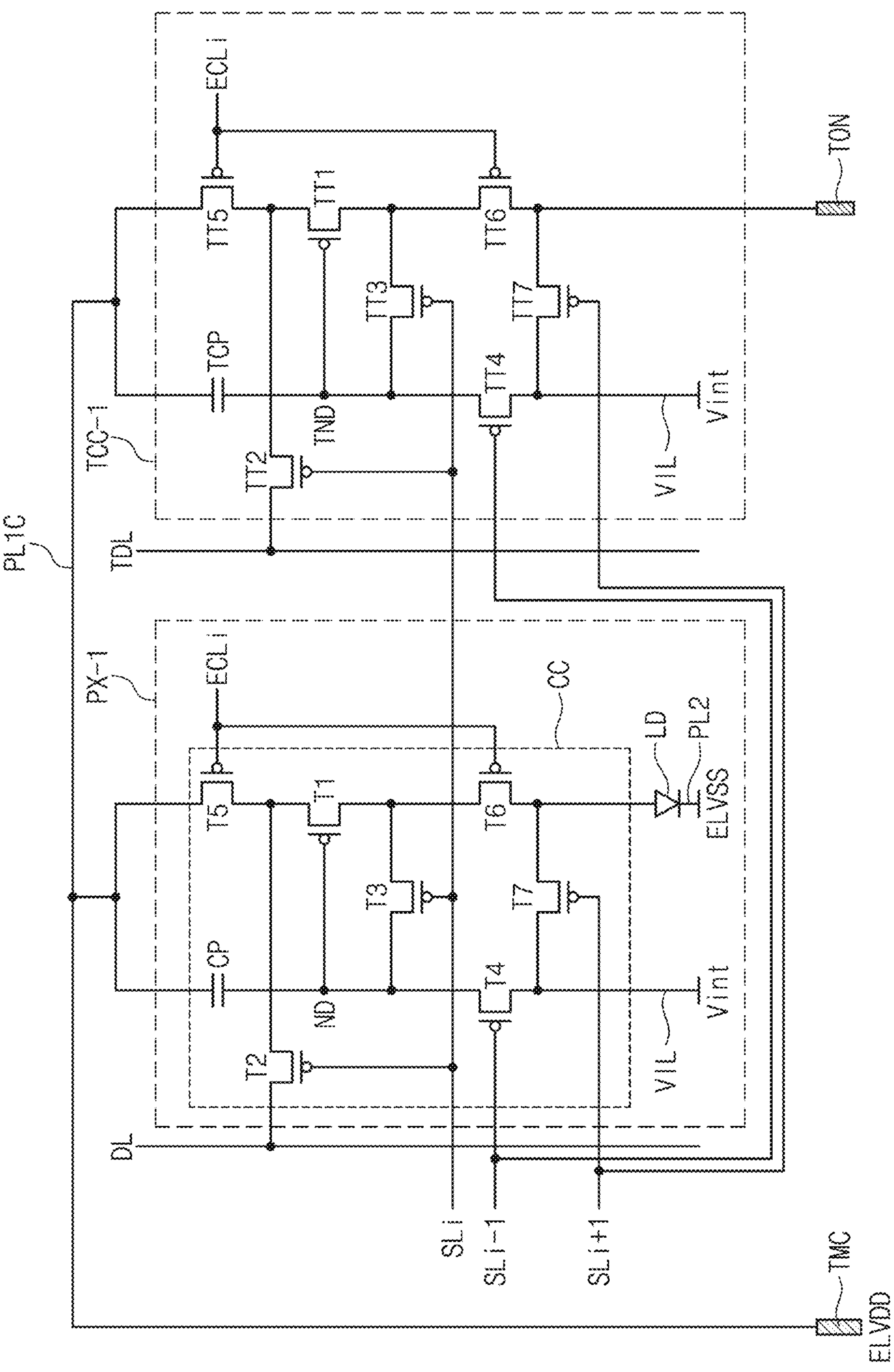
FIG. 16 is an equivalent circuit diagram of a pixel and a test circuit according to an embodiment of the inventive concept.

FIG. 15 is a plan view of a display panel according to an embodiment of the inventive concept. FIG. 16 is an equivalent circuit diagram of a pixel and a test circuit according to an embodiment of the inventive concept.

Referring to FIGS. 15 and 16, a display panel DP-1 may include a pixel PX-1 disposed in the display region DDA, and a test circuit TCC-1 disposed in at least any one of the first to sixth test regions TA1, TA2, TA3, TA4, TA5, or TA6.

The pixel PX-1 and the test circuit TCC-1 may receive the same power voltage ELVDD through a same power line PL1C. The power line PL1C is exemplarily illustrated as being connected to one terminal TMC, but the power line PL1C may be connected to a plurality of terminals.

As described above, a display panel may include a test circuit. The test circuit may substantially have the same configuration as a pixel circuit of a pixel. Even when the test circuit is not connected to a light emitting element, a current sensed though an output node of the test circuit by a circuit element included in a driving circuit may be similar to a current sensed when the light emitting element is connected to the output node. Therefore, afterimage properties of the pixel may be confirmed using the test circuit instead of the pixel. That is, since afterimage properties are tested using the test circuit, a pixel used to display an actual image is not deteriorated by an afterimage properties test according to embodiments of the inventive concept.

While the present inventive concept has been particularly shown and described with reference to embodiments thereof, it will be understood by those of ordinary skill in the art that various changes in form and detail may be made therein without departing from the spirit and scope of the present inventive concept as defined by the following claims.

What is claimed is:

1. An electronic device, comprising:

a display panel having a display region and a non-display region adjacent to the display region; and a driving circuit electrically connected to the display panel and configured to drive the display panel, wherein the display panel includes a pixel disposed in the display region, a first test circuit disposed in the non-display region, and a second test circuit disposed in the non-display region, the driving circuit includes a first circuit element configured to adjust an operation point of a first test transistor included in the first test circuit according to a voltage applied to the first test circuit, and a second circuit element configured to adjust an operation point of a second test transistor included in the second test circuit according to a voltage applied to the second test circuit, the first test circuit includes a first output node electrically connected to the first circuit element, and the second test circuit includes a second output node electrically connected to the second circuit element, and an afterimage property of the pixel is checked by comparing a current output from the first output node of the first test circuit instead of the pixel with a current output from the second output node of the second test circuit instead of the pixel.

2. The electronic device of claim 1, wherein at least one of the first circuit element or the second circuit element comprises a programmable resistor.

3. The electronic device of claim 1, wherein at least one of the first circuit element or the second circuit element comprises a diode-coupled transistor.

4. The electronic device of claim 1, wherein the pixel comprises a pixel circuit and a light emitting element, and the pixel circuit includes the same components as the first test circuit and the second test circuit.

5. The electronic device of claim 4, wherein the pixel circuit comprises a driving transistor configured to control an amount of current flowing in the light emitting element, the first test circuit comprises a test driving transistor configured to control an amount of current provided to the first circuit element, a connection relationship of the driving transistor with other transistors in the pixel circuit is the same as a connection relationship of the test driving transistor with other test transistors in the first test circuit, and the driving transistor is electrically connected to a power line to which a power voltage is provided, and the test driving transistor is electrically connected to a test power line to which the power voltage is provided.

6. The electronic device of claim 5, wherein the operation point is an operation point of the test driving transistor.

7. The electronic device of claim 5, wherein the power line and the test power line receive the power voltage through a same terminal.

8. The electronic device of claim 5, wherein the power line and the test power line each receive the power voltage through different terminals.

9. The electronic device of claim 5, wherein the power line and the test power line are electrically separated from each other in the display panel.

10. The electronic device of claim 1, wherein during a test operation interval, a first test voltage is applied to the first test circuit and a second test voltage different from the first test voltage is applied to the second test circuit.

11. The electronic device of claim 10, wherein after the test operation interval, a third test voltage different from the first and second test voltages is applied to the first test circuit and the second test circuit.

12. The electronic device of claim 11, wherein a first voltage level of the first test voltage is a black gradation voltage, a second voltage level of the second test voltage is a white gradation voltage, and a third voltage level of the third test voltage is a gray gradation voltage, and the first voltage level, the second voltage level, and the third voltage level are different voltage levels.

13. An electronic device, comprising:

a pixel including a light emitting element and a driving transistor configured to control an amount of current flowing in the light emitting element;

a first test circuit including a first test driving transistor and a first output node;

a second test circuit including a second test driving transistor and a second output node; and a driving circuit electrically connected to the pixel and the first and second test circuits, wherein the driving circuit includes a first circuit element electrically connected to the first output node of the first test circuit and configured to adjust an operation point of the first test driving transistor according to a voltage applied to the first test circuit, and a second circuit element electrically connected to the second output node of the second test circuit and configured to adjust an operation point of the second test driving transistor included in the second test circuit according to a voltage applied to the second test circuit, wherein an afterimage property of the pixel is checked by comparing a current output from the first output node of the first test circuit instead of the pixel with a current output from the second output node of the second test circuit instead of the pixel.

14. The electronic device of claim 13, wherein the driving transistor is electrically connected to a power line to which a power voltage is provided, and at least one of the first test driving transistor or the second test driving transistor is electrically connected to a test power line to which the power voltage is provided.

15. The electronic device of claim 14, wherein the power line and the test power line receive the power voltage through a same terminal.

16. The electronic device of claim 14, wherein the power line and the test power line each receive the power voltage through different terminals.

17. The electronic device of claim 14, wherein the power line and the test power line are electrically separated from each other.

18. The electronic device of claim 13, wherein at least one of the first circuit element or the second circuit element comprises a programmable resistor.

19. The electronic device of claim 13, wherein at least one of the first circuit element or the second circuit element comprises a diode-coupled transistor.

* * * * *